(12) United States Patent
Bhanage et al.

(10) Patent No.: US 11,540,135 B2
(45) Date of Patent: Dec. 27, 2022

(54) CHARACTERIZING INTRUSIONS USING SPATIAL REUSE PARAMETERS

(71) Applicant: Cisco Technology, Inc., San Jose, CA (US)

(72) Inventors: Gautam D. Bhanage, Milpitas, CA (US); Benjamin J. Cizdziel, San Jose, CA (US); Vishal S. Desai, San Jose, CA (US); Ardalan Alizadeh, San Jose, CA (US); Khashayar Mirfakhraei, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 16/869,370

(22) Filed: May 7, 2020

(65) Prior Publication Data

US 2021/0352483 A1   Nov. 11, 2021

(51) Int. Cl.
| | | |
|---|---|---|
| *H04W 12/122* | (2021.01) | |
| *H04W 12/63* | (2021.01) | |
| *H04W 12/08* | (2021.01) | |

(52) U.S. Cl.
CPC ......... *H04W 12/122* (2021.01); *H04W 12/08* (2013.01); *H04W 12/63* (2021.01)

(58) Field of Classification Search
CPC . H04W 84/12; H04W 74/0816; H04W 28/06; H04W 52/0229; H04W 48/16; H04W 52/0245; H04W 52/24; H04W 52/245; H04W 74/08; H04W 12/122; H04W 12/63; H04W 12/08; H04L 27/0006; H04L 27/2602; H04L 27/2603; H04B 17/318; H04B 1/7073
See application file for complete search history.

(56) References Cited

U.S. PATENT DOCUMENTS

| | | | |
|---|---|---|---|
| 6,865,609 B1 * | 3/2005 | Gubbi | ..................... H04L 29/06 |
| | | | 370/349 |
| 7,002,943 B2 | 2/2006 | Bhagwat et al. | |
| 8,000,698 B2 | 8/2011 | Wolman et al. | |
| 9,603,021 B2 | 3/2017 | Scahill et al. | |
| 10,039,115 B2 | 7/2018 | Cariou et al. | |
| 10,136,349 B2 | 11/2018 | Yang | |
| 10,952,095 B2 * | 3/2021 | Morioka | ............. H04W 52/245 |

(Continued)

FOREIGN PATENT DOCUMENTS

| | | | | |
|---|---|---|---|---|
| JP | 6599994 B2 * | 10/2019 | ........... | H04L 5/0037 |
| WO | WO-2018196642 A1 * | 11/2018 | ............ | H04W 74/06 |

OTHER PUBLICATIONS

PCT Notification of the International Search Report and the Written Opinion of the International Searching Authority, or the Declaration for Application No. PCT/US2021/070448 dated Jul. 28, 2021.

(Continued)

*Primary Examiner* — Matthew C Sams
(74) *Attorney, Agent, or Firm* — Patterson + Sheridan, LLP

(57) ABSTRACT

Aspects described herein include a method for use with an access point (AP). The method comprises inspecting control frames received from a rogue AP, characterizing an intrusion by the rogue AP using one or more spatial reuse parameters included in the control frames, and selecting a defensive posture for the AP based on the characterization.

16 Claims, 6 Drawing Sheets

(56) References Cited

U.S. PATENT DOCUMENTS

| | | | | |
|---|---|---|---|---|
| 2012/0027064 A1* | 2/2012 | Gupta | ............... | H04L 25/0307 |
| | | | | 375/224 |
| 2015/0359008 A1* | 12/2015 | Wang | ............... | H04W 74/0875 |
| | | | | 370/330 |
| 2016/0227441 A1* | 8/2016 | Park | ............... | H04W 74/0816 |
| 2017/0142659 A1* | 5/2017 | Noh | ............... | H04W 52/0245 |
| 2017/0255659 A1* | 9/2017 | Cariou | ............... | G09G 5/393 |
| 2018/0110046 A1* | 4/2018 | Patil | ............... | H04W 72/0446 |
| 2018/0270038 A1* | 9/2018 | Oteri | ............... | H04L 5/0044 |
| 2019/0174577 A1* | 6/2019 | Patil | ............... | H04W 88/08 |
| 2019/0313282 A1* | 10/2019 | Morioka | ............... | H04W 28/06 |
| 2020/0045637 A1* | 2/2020 | Noh | ............... | H04L 27/2602 |
| 2020/0083969 A1* | 3/2020 | Patwardhan | ............... | H04W 48/16 |
| 2020/0288500 A1* | 9/2020 | Hirata | ............... | H04W 74/0816 |

OTHER PUBLICATIONS

Sepic Nina et al., "Evaluating spatial reuse in 802.11ax networks with interference threshold adjustment," 2020 24th International Conference on Information Technology (IT), IEEE, Feb. 18, 2020 (Feb. 18, 2020).

Khorov Evgeny et al., "A Tutorial on IEEE 802.11ax High Efficiency WLANs", IEEE Communications Surveys & Tutorials, vol. 21, No. 1, Feb. 21, 2019 (Feb. 21, 2019), pp. 197-216.

Khorov et al., "A Tutorial on IEEE 802.11ax high Efficiency WLANs," IEEE Communications Surveys & Tutorials, vol. 21, No. 1, First Quarter 2019.

Reza Hedayat, "newarcom, Spatial Reuse Group Challenges," Mar. 13, 2017, 12 pages.

* cited by examiner

US 11,540,135 B2

CHARACTERIZING INTRUSIONS USING SPATIAL REUSE PARAMETERS

TECHNICAL FIELD

Embodiments presented in this disclosure generally relate to wireless network devices, and more specifically, to improving wireless network performance during spatial reuse operation.

BACKGROUND

With the proliferation of wireless local area networks (WLANs), it is increasingly common for multiple WLANs to overlap within a given area. Conventional channel access mechanisms such as carrier-sense multiple access (CSMA) are designed to support only a limited number of contending devices, which typically causes network performance to decrease with increasing numbers of devices. To improve WLAN performance, several techniques have been recently introduced to IEEE 802.11 networking standards, such as channel bonding, orthogonal frequency-division multiple access (OFDMA), downlink/uplink multi-user multiple-input-multiple-output (DL/UL MU-MIMO), and spatial reuse (SR) operation.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
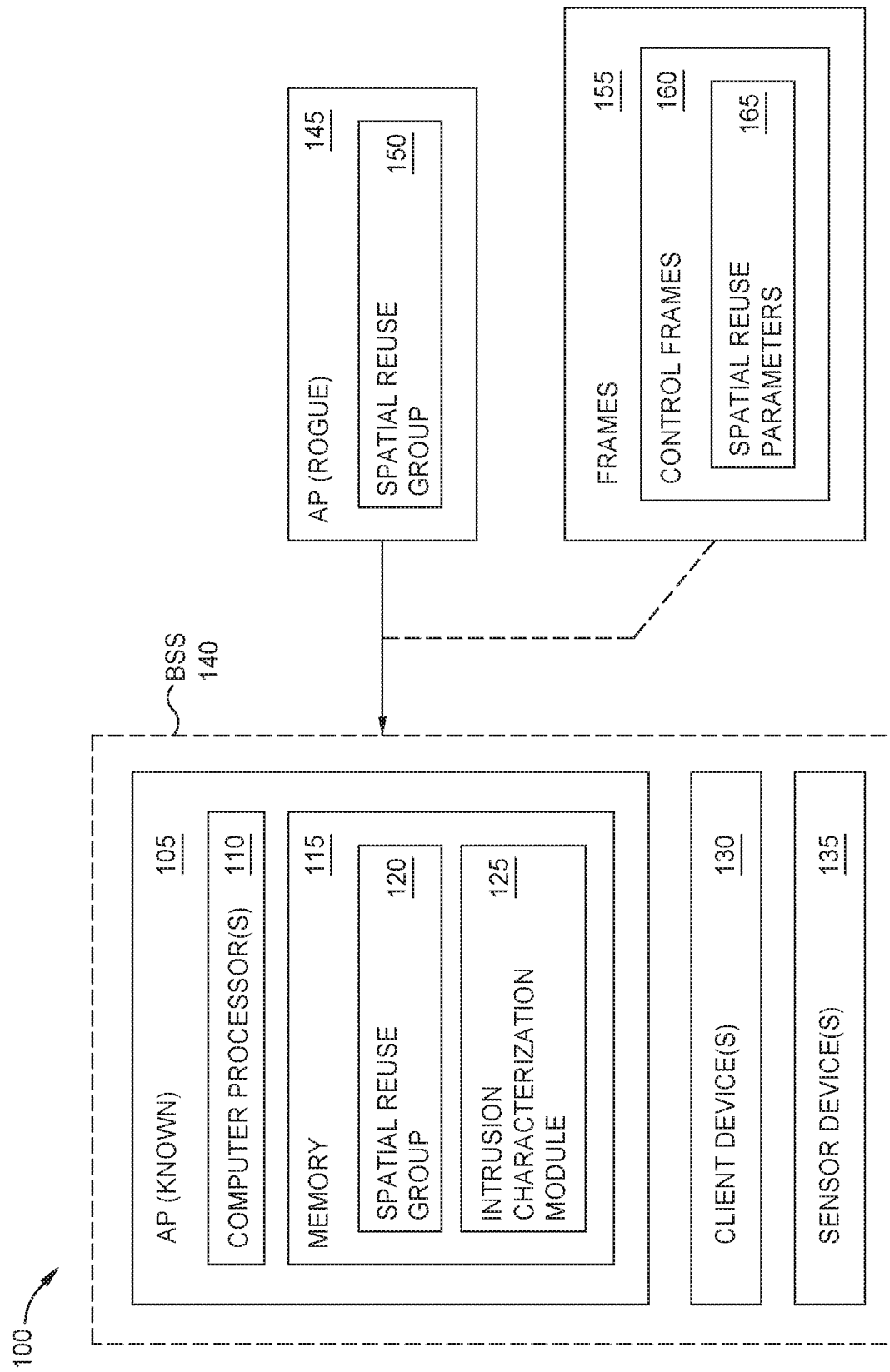
FIG. 1 illustrates an exemplary system having a rogue access point (AP), according to one or more embodiments.

One embodiment presented in this disclosure is a method for use with an access point (AP). The method comprises inspecting control frames received from a rogue AP, characterizing an intrusion by the rogue AP using one or more spatial reuse parameters included in the control frames, and selecting a defensive posture for the AP based on the characterization.

Another embodiment presented in this disclosure is an access point (AP) comprising one or more computer processors configured to detect an intrusion by a rogue AP, characterize the intrusion using one or more spatial reuse parameters included in control frames transmitted by the rogue AP, and select a defensive posture for the AP based on the characterization.

Another embodiment presented in this disclosure is a computer program product comprising a computer-readable storage medium having computer-readable program code embodied therewith. The computer-readable program code is executable by one or more computer processors to perform an operation comprising detecting an intrusion by a rogue access point (AP), and characterizing the intrusion using one or more spatial reuse parameters included in control frames transmitted by the rogue AP. The characterization of the intrusion is used to select a defensive posture for a known AP.

EXAMPLE EMBODIMENTS

Spatial reuse groups (SRGs) have been introduced by the IEEE 802.11ax standard and allow overlapping basic service sets (OBSSs) of different access points (APs) to operate more efficiently by selectively adopting a more aggressive posture for channel access. Membership in the SRGs is typically controlled by a radio resource management (RRM) algorithm, which advertises a set of one or more BSS "colors" that are associated with the SRG. Thus, a packet may be identified as belonging to the SRG of the receiver where the BSS color is found in the SRG membership list of the receiver.

Each AP may transmit control frames (also referred to as "management frames") that advertise the SRG membership of the AP along with one or more sensitivity thresholds for the SRG. For example, the AP may transmit a Spatial Reuse Parameter Set (SRPS) element that includes configurable SRG OBSS/PD (packet detect) threshold values (min and max) that control how aggressive a particular BSS is relative to one or more other BSSs within the SRG.

A "rogue" AP that is managed by another managing entity (e.g., another RRM algorithm) may intrude on a "known" BSS of a "known" AP by adding the known BSS to the SRG list of the rogue AP. The rogue AP may have its spatial reuse parameters set such that the rogue AP and any client devices are aggressive toward the known BSS, causing a significant degradation in the performance of the known BSS. Such an intrusion by the rogue AP may be intentional (e.g., specifically targeting the known BSS) or unintentional (e.g., another BSS on the managed network of the rogue AP coincidentally uses a same color as the known BSS).

In an exemplary method described herein, a known AP (or another device within the known BSS, such as a neighboring AP or a sensor device) inspects control frames received from a rogue AP, and using one or more spatial reuse parameters included in the control frames, characterizes an intrusion by the rogue AP. The known AP selects a defensive posture based on the characterization of the intrusion, which may mitigate the effects of the intrusion on the performance of the known BSS.

In some embodiments, characterizing the intrusion comprises characterizing the rogue AP (e.g., characterizing an intent of the intrusion) and/or calculating a severity of the intrusion. The known AP may adopt different defensive postures based on the characterization of the intrusion. For example, if the rogue AP is characterized as "benign" (e.g., the intrusion is unintentional), the known AP may change the color of the known BSS, may change the channel of the known BSS, may do nothing (e.g., maintain the status quo ante), and so forth. If the rogue AP is characterized as "malicious" (e.g., the intrusion is intentional), the known AP may select a heightened or enhanced defensive posture to further mitigate the effects of the intrusion. For example, the known AP may add the rogue BSS to the SRG of the known AP, and may adjust a sensitivity threshold for the SRG to cause the known AP to be more aggressive toward the rogue BSS. In some cases, the magnitude of the adjustment may be based on the severity of the intrusion.

FIG. 1 illustrates an exemplary system 100 having a rogue AP 145, according to one or more embodiments. More specifically, the system 100 comprises a known AP 105 that is managed by a first managing entity, while the rogue AP 145 is managed by a second managing entity that is distinct from the first managing entity. A known BSS 140 associated with the known AP 105 may specify physical layer medium access characteristics that are shared by the known AP 105, one or more client devices 130, one or more sensor devices 135, and/or one or more neighboring APs (not shown). Generally, the known AP 105 operates as a redistribution point for communicating between the one or more client devices 130, the one or more sensor devices 135, the one or more neighboring APs, and so forth.

The known AP 105 comprises one or more computer processors 110 (also referred to herein as "processors 110") and a memory 115. The one or more computer processors 110 may be implemented in any suitable form, such as a general purpose microprocessor, a controller, an application-specific integrated circuit (ASIC), and so forth. The memory 115 may include a variety of computer-readable media selected for their size, relative performance, or other capabilities: volatile and/or non-volatile media, removable and/or non-removable media, etc.

The memory 115 may include one or more modules for performing various functions described herein. In one embodiment, each module includes program code that is executable by the one or more computer processors 110. However, other embodiments of the system 100 may include modules that are partially or fully implemented in other hardware (i.e., circuitry) or firmware, such as hardware or firmware included in the one or more client devices 130, the one or more sensor devices 135, the one or more neighboring APs, and so forth. Stated another way, the overall functionality of the one or more modules may be distributed among other devices of the system 100. As shown, the memory 115 comprises an intrusion characterization module 125 that characterizes an intrusion by the rogue AP 145 using one or more spatial reuse parameters 165 included in control frames 160 transmitted by the rogue AP 145. The intrusion characterization module 125 may have additional functionality, such as inspecting the control frames 160 and detecting the intrusion, selecting the defensive posture for the known AP 105, and so forth.

The memory 115 further comprises spatial reuse group (SRG) information 120 that defines and/or controls membership in the SRG. In some embodiments compatible with the IEEE 802.11ax standard, the SRG information 120 comprises a BSS color bitmap of the SRPS element that stores different BSS colors for BSSes included in the particular SRG. The known AP 105 maintains the BSS color bitmap and informs the one or more client devices 130, the one or more sensor devices 135, and/or the one or more neighboring APs of any changes occurring to the BSS color bitmap.

Although not described in detail herein, the rogue AP 145 may comprise similar hardware as the known AP 105, such as one or more computer processors and a memory. The rogue AP 145 comprises SRG information 150 that includes the known BSS 140, which enables the rogue AP 145 to intrude on the known BSS 140. For example, the rogue AP 145 may maintain a separate BSS color bitmap and may include the BSS color assigned to the known BSS 140.

During an intrusion by the rogue AP 145, the rogue AP 145 transmits a plurality of frames 155 that are received by one or more devices of the known BSS 140. The plurality of frames 155 include the control frames 160, which include one or more spatial reuse parameters 165 that indicate a level of aggressiveness (or intrusiveness) of the rogue AP 145. As mentioned above, and as will be discussed further, the intrusion characterization module 125 characterizes the intrusion using the one or more spatial reuse parameters 165, and selects a defensive posture for the known AP 105 based on the characterization.

The one or more client devices 130 may include any suitable computing devices. For example, the one or more client devices 130 may include desktop computing devices, mobile computing devices (e.g., smartphones, tablets), wearable computing devices, and other electronic devices (e.g., printers, smart televisions, smart appliances).

The one or more sensor devices 135 may have any suitable implementation. In some embodiments, the one or more sensor devices 135 comprise one or more computer processors that perform monitoring and/or testing to determine network performance. In some embodiments, the one or more sensor devices 135 receives the control frames 160 from the rogue AP 145.

Figure 2:
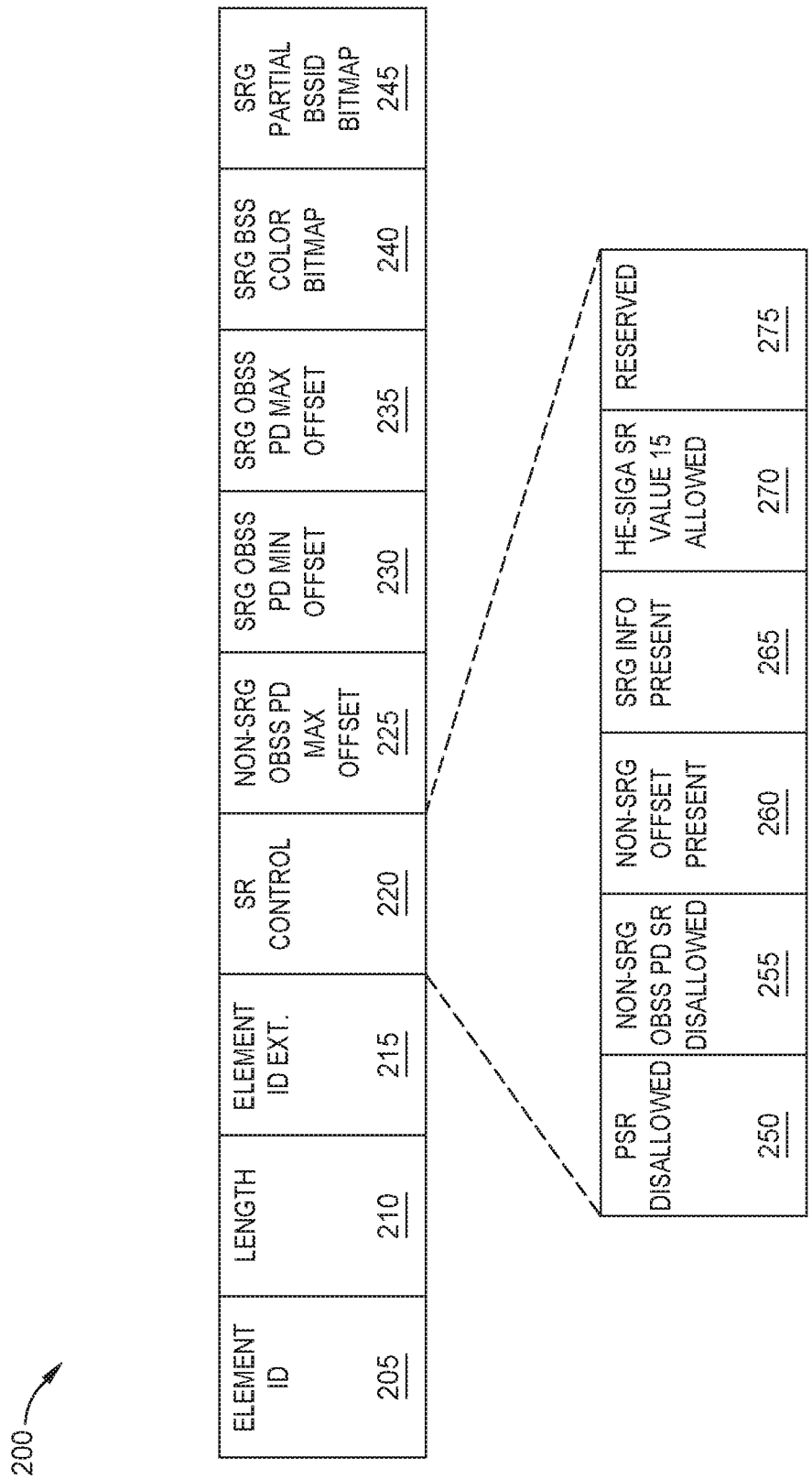
FIG. 2 illustrates an exemplary spatial reuse parameter set of a control frame, according to one or more embodiments.

FIG. 2 illustrates an exemplary SRPS element 200 of a control frame, according to one or more embodiments. Generally, the SRPS element 200 provides information for performing OBSS/PD-based SR operation in 802.11ax-compatible WLANs. The features illustrated in FIG. 2 may be used in conjunction with other embodiments discussed herein. For example, certain types of control frames transmitted by the rogue AP 145 and/or the known AP 105 (e.g., beacons, probe responses, and (re)association responses) may be formatted to include the SRPS element 200.

The SRPS element 200 comprises spatial reuse parameters arranged as a plurality of fields: an element ID 205, a length 210, an element ID extension 215, a SR control field 220, a non-SRG OBSS/PD max offset 225, a SRG OBSS/PD min offset 230, a SRG OBSS/PD max offset 235, a SRG BSS color bitmap 240, and a SRG partial BSSID bitmap 245. Each of the fields may have suitable sizing and formatting.

The element ID 205, the length 210, and the element ID extension 215 may have any suitable values. The non-SRG OBSS/PD max offset 225 comprises an integer value to generate the maximum non-SRG OBSS/PD threshold. The SRG OBSS/PD min offset 230 comprises an integer value to generate the minimum SRG OBSS/PD threshold, and the SRG OBSS/PD max offset 235 comprises an integer value to generate the maximum SRG OBSS/PD threshold. The SRG BSS color bitmap 240 indicates which BSS color values are used by the members of the SRG. The SRG partial BSSID bitmap 245 indicates which partial BSSID values are used by members of the SRG.

The SR control field 220 comprises the following parameters: Parameterized Spatial Reuse (PSR) disallowed 250, non-SRG OBSS/PD SR disallowed 255, non-SRG offset present 260, SRG information present 265, HE-SIGA spatial reuse value 15 allowed 270, and reserved 275. The PSR disallowed 250 indicates whether PSR-based SR transmissions are allowed at non-AP stations that are associated with the transmitting AP, and the non-SRG OBSS/PD SR disallowed 255 indicates whether non-SRG OBSS/PD SR transmissions are allowed at the non-AP stations. The non-SRG offset present 260 indicates whether the non-SRG OBSS/PD max offset 225 is present, and the SRG information present 265 indicates whether the SRG OBSS/PD min offset 230, the SRG OBSS/PD max offset 235, the SRG BSS color bitmap 240, and the SRG partial BSSID bitmap 245 are present. The HE-SIG-A spatial reuse value 15 allowed 270 indicates whether the non-AP stations may set a TXVECTOR parameter SPATIAL REUSE to restrict both PSR-based and non-SRG OBSS PD-based SR transmissions from being transmitted over their packets.

As discussed above, an intrusion by a rogue AP may be detected by inspecting control frames received from the rogue AP. For example, the SRG BSS color bitmap 240 may be inspected to determine whether the BSS color associated with a known AP is included. In some cases, the SRG partial BSSID bitmap 245 may also be used to identify whether the rogue AP is adding the BSSID of the known AP to its own SRG list. The intrusion may also be characterized using one or more spatial reuse parameters included in the control frames. For example, a severity of the intrusion may be calculated using the value of the SRG OBSS/PD max offset 235, which indicates how aggressive (or intrusive) the rogue AP 145 is behaving toward the known BSS. Calculating the severity of the intrusion may be further based on one or more other characteristics of the frames received from the rogue AP.

Figure 3:
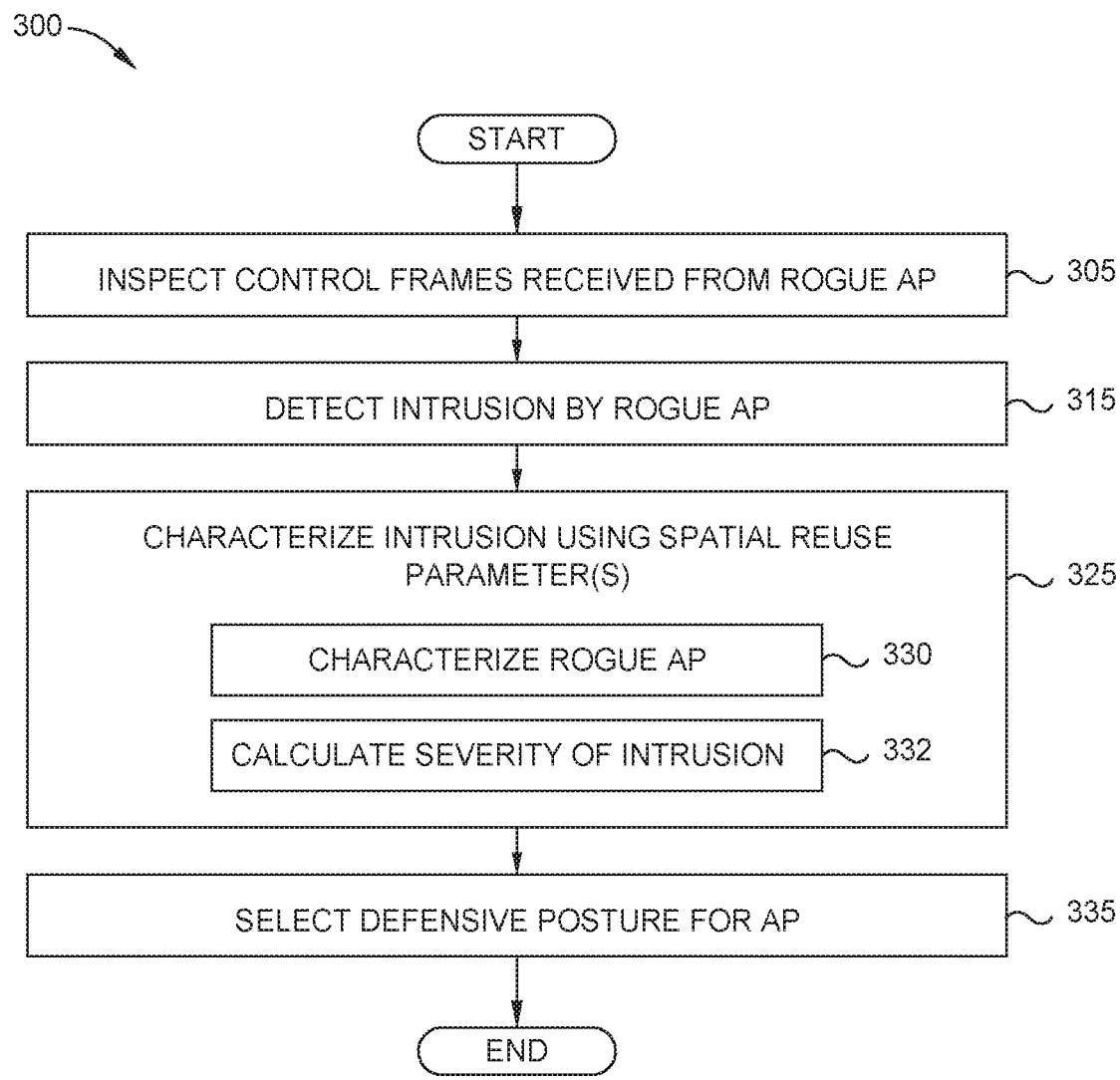
FIG. 3 is an exemplary method for use with an AP, according to one or more embodiments.

FIG. 3 is an exemplary method 300 for use with an AP, according to one or more embodiments. The method 300 may be used in conjunction with other embodiments discussed herein, such as being performed using the intrusion characterization module 125 of FIG. 1.

The method 300 begins at block 305, where control frames are received from a rogue AP and inspected. At block 315, an intrusion by the rogue AP is detected. In some embodiments, detecting the intrusion comprises identifying a BSS of a known AP in the SRG of the rogue AP. For example, the BSS of the known AP may be identified using spatial reuse parameter(s) included in the control frames, such as a BSS color bitmap and/or a BSSID bitmap of the rogue AP.

Figure 5:
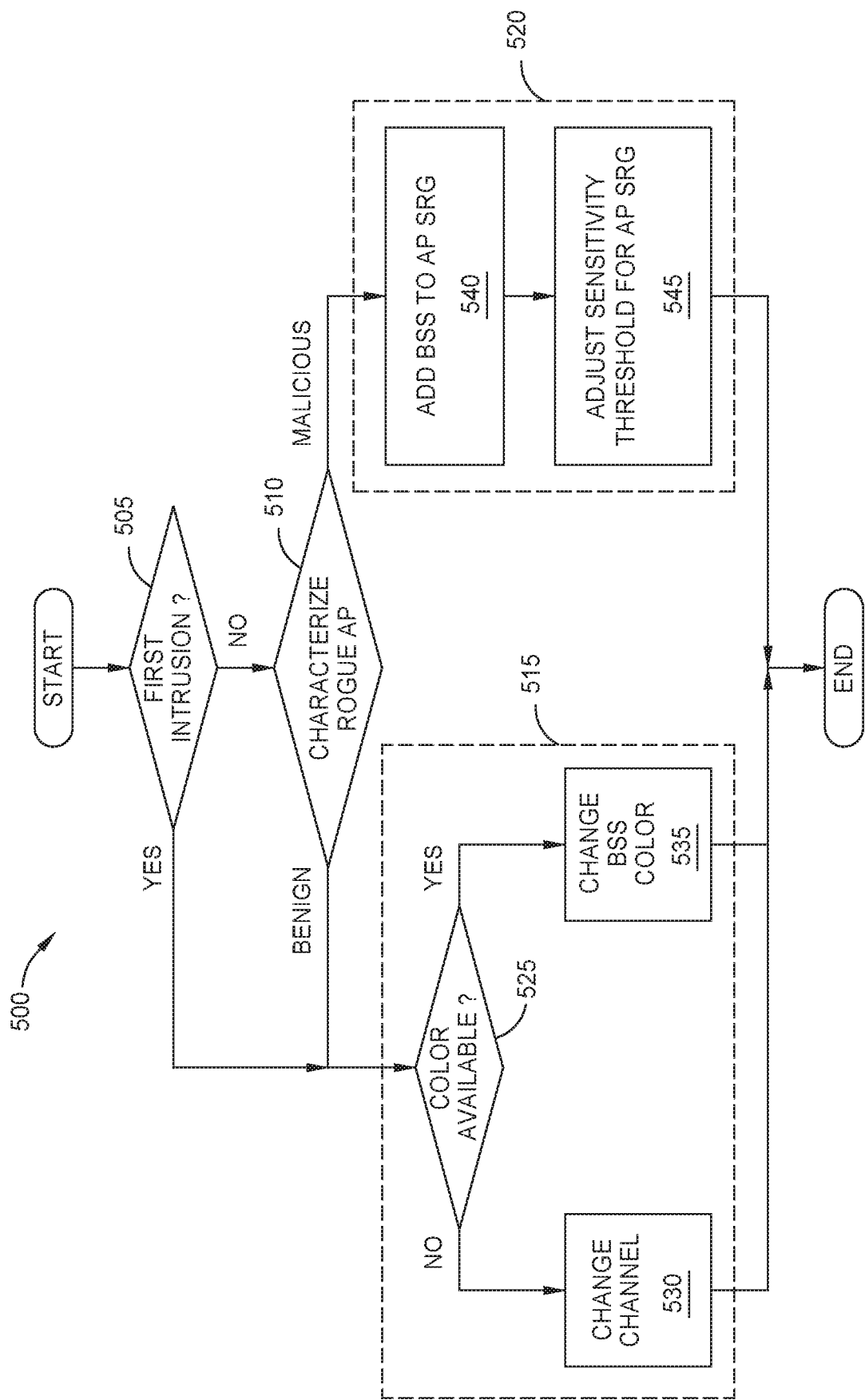
FIG. 5 is an exemplary method of selecting a defensive posture for an AP, according to one or more embodiments.
Figure 6:
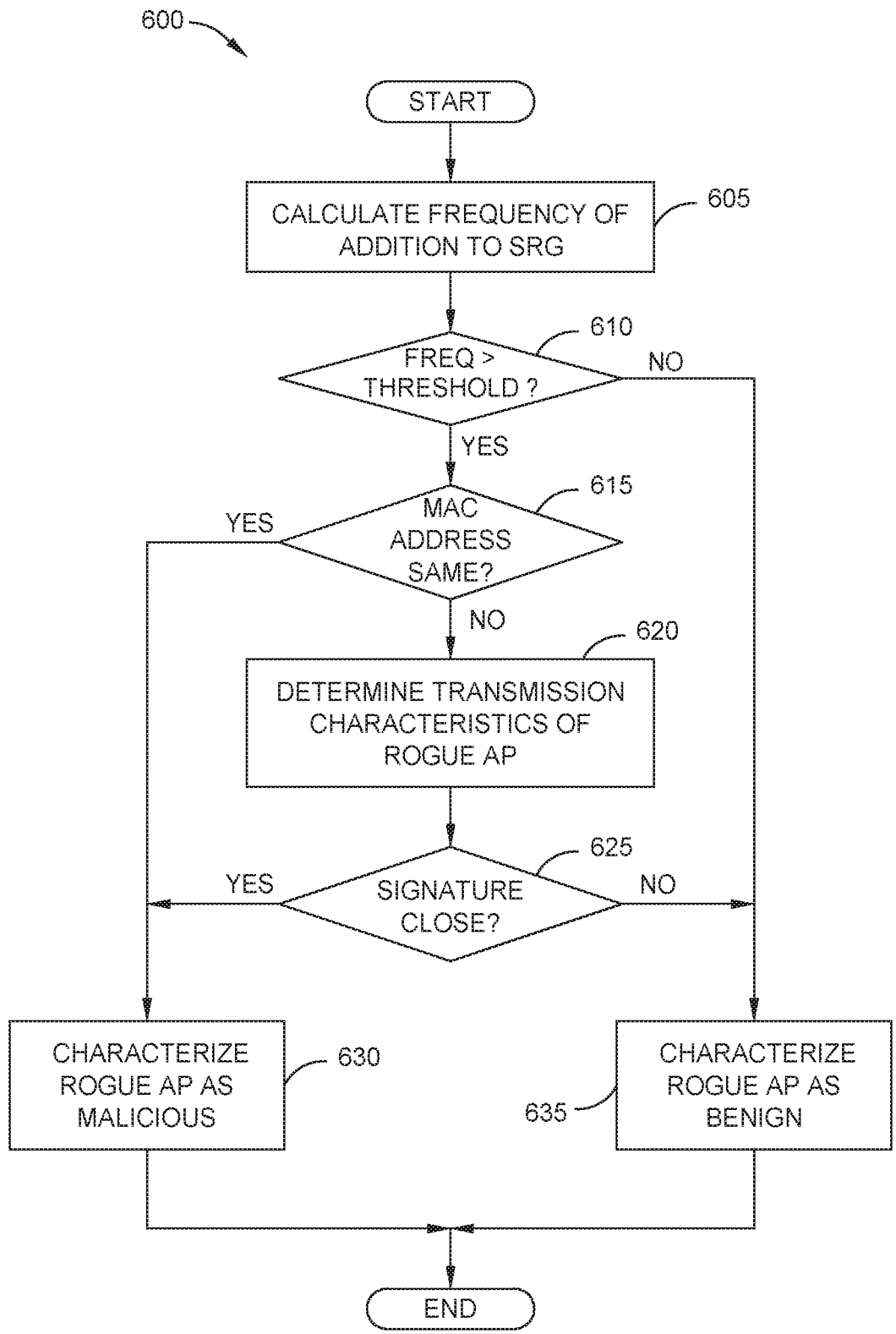
FIG. 6 is an exemplary method of characterizing a rogue AP, according to one or more embodiments.

At block 325, the intrusion is characterized using spatial reuse parameter(s) included in the control frames. In some embodiments, characterizing the intrusion comprises one or both of characterizing the rogue AP (block 330) and calculating a severity of the intrusion (block 332). FIG. 6, discussed below, provides an exemplary method of characterizing the rogue AP. Exemplary techniques for calculating the severity of the intrusion are also discussed below. At block 335, a defensive posture is selected for the known AP based on the characterization of the intrusion. FIG. 5, discussed below, provides an exemplary method of selecting a defensive posture for the known AP. The method 300 ends following completion of the block 335.

Figure 4A:
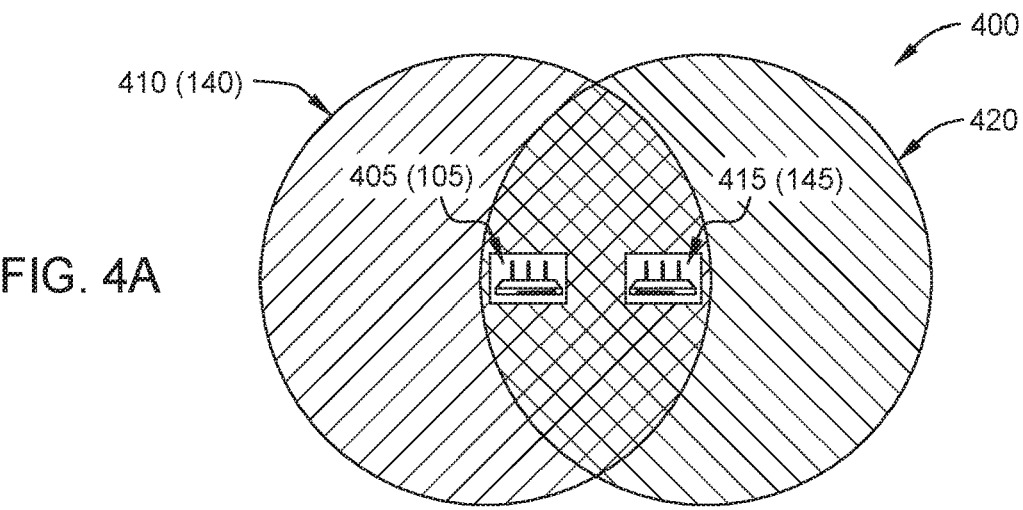
FIG. 4A illustrates using a known AP to detect an intrusion by a rogue AP, according to one or more embodiments.

FIG. 4A illustrates using a known AP to detect an intrusion by a rogue AP, according to one or more embodiments. In diagram 400, a known AP 405 (one example of the known AP 105 of FIG. 1) is associated with a known BSS 410 (one example of the known BSS 140). A rogue AP 415 (one example of the rogue AP 145) is associated with a rogue BSS 420. In some embodiments, the known BSS 410 is associated with a first BSS color (e.g., blue) while the rogue BSS 420 is associated with a second BSS color (e.g., green).

The coverage of the rogue BSS 420 is shown as partly overlapping with the coverage of the known BSS 410. The SRG associated with the rogue BSS 420 includes the first BSS color, indicating that the rogue BSS 420 is intruding on the known BSS 410.

In the diagram 400, the known AP 405 is being illustrated within the coverage of the rogue BSS 420. Thus, the known AP 405 is able to directly receive control frames transmitted by the rogue AP 415, In some embodiments, the known AP 405 inspects the SRPS element of the control frames to determine whether the known BSS 410 is included in the SRG associated with the rogue BSS 420.

In some embodiments, the known AP 405 inspects the frames transmitted by the rogue AP 415 (which may include the SRPS element of the control frames) to characterize an intrusion by the rogue BSS 420. For example, the known AP 405 may inspect the SRG OBSS/PD min and/or max values to determine how aggressive (or intrusive) the rogue BSS is being toward the known BSS 410.

Figure 4B:
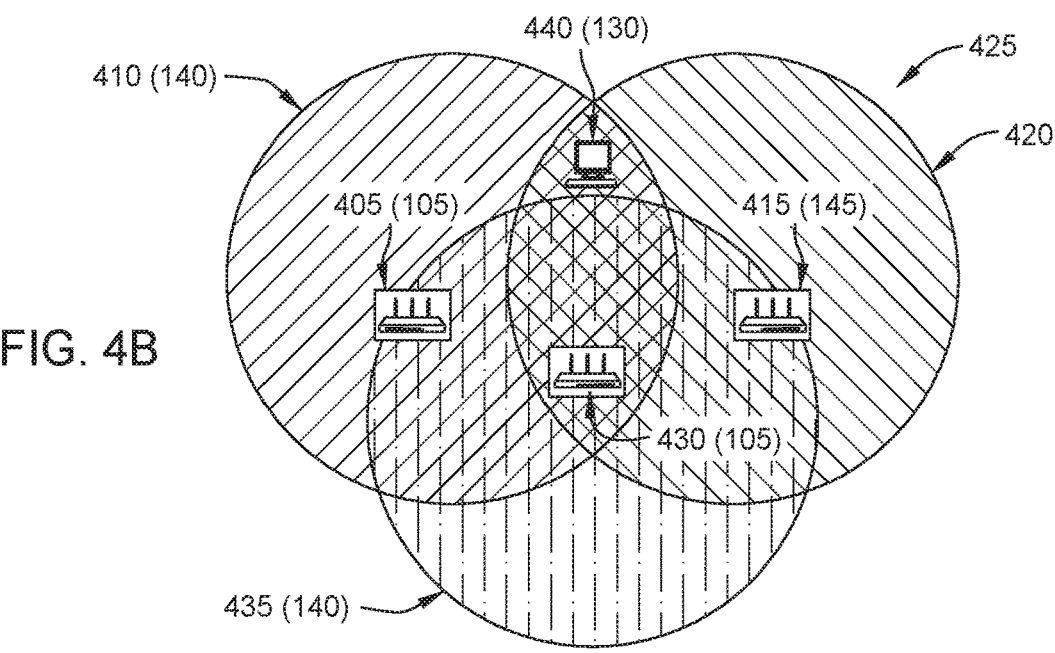
FIG. 4B illustrates using a neighboring AP to detect an intrusion by a rogue AP, according to one or more embodiments.

FIG. 4B illustrates using a neighboring AP to detect an intrusion by a rogue AP, according to one or more embodiments. Diagram 425 includes the known AP 405 and the rogue AP 415, as well as a neighboring AP 430 associated with a neighboring BSS 435, and a client device 440 (one example of the one or more client devices 130 of FIG. 1) within the known BSS 410. In some embodiments, the neighboring AP 430 is associated with a third BSS color (e.g., red) that is different from the first BSS color and the second BSS color.

The coverage of the known BSS 410 and the neighboring BSS 435 are partly overlapping. The coverage of the rogue BSS 420 is partly overlapping with the coverage of the known BSS 410 and with the neighboring BSS 435. The SRG associated with the rogue BSS 420 includes the first BSS color, indicating that the rogue BSS 420 is intruding on the known BSS 410.

In the diagram 425, the known AP 405 is outside the coverage of the rogue BSS 420, meaning that the known AP 405 is not able to directly receive the control frames transmitted by the rogue AP 415, However, the coverage of the rogue BSS 420 does include the neighboring AP 430 and the client device 440, which allows the intrusion to affect the known BSS 410.

In this case, the neighboring AP 430 may receive the control frames transmitted by the rogue AP 415, and may inspect the control frames to identify whether the known BSS 410 (e.g., a BSS of a neighboring AP, relative to the neighboring AP 430) is in the SRG of the rogue AP 415. In this way, the neighboring AP 430 may detect the intrusion by the rogue AP 415. The neighboring AP 430 may signal the intrusion to the known AP 405, or may further characterize the intrusion and/or select a defensive posture for the known AP 405.

Figure 4C:
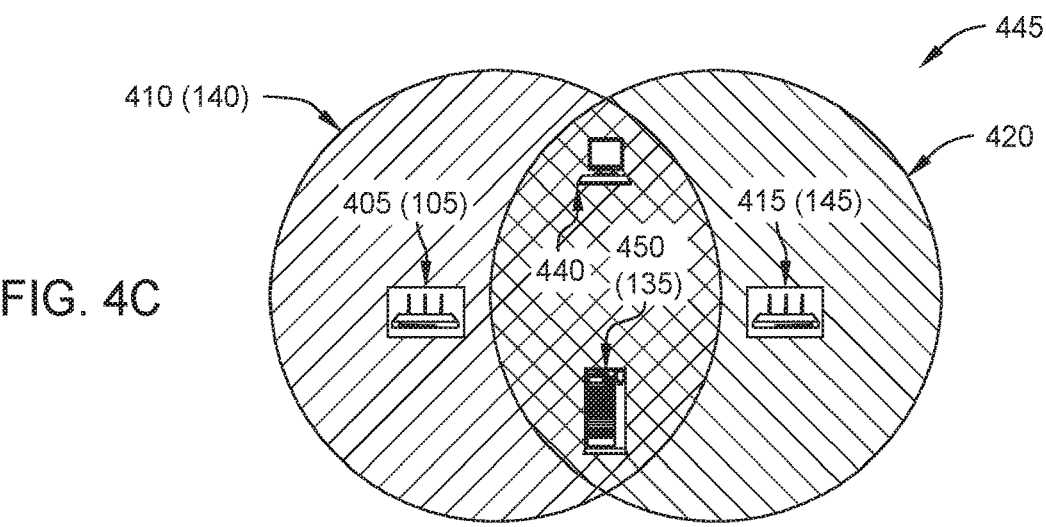
FIG. 4C illustrates using a sensor device to detect an intrusion by a rogue AP, according to one or more embodiments.

FIG. 4C illustrates using a sensor device 450 (one example of the one or more sensor devices 135 of FIG. 1) to detect an intrusion by a rogue AP, according to one or more embodiments. Diagram 445 includes the known AP 405, the rogue AP 415, the client device 440, as well as the sensor device 450 within the known BSS 410.

In the diagram 445, the known AP 405 is outside the coverage of the rogue BSS 420, meaning that the known AP 405 is not able to directly receive the control frames transmitted by the rogue AP 415. However, the coverage of the rogue BSS 420 does include the client device 440 and the sensor device 450, which allows the intrusion to affect the known BSS 410.

In this case, the sensor device 450 may receive the control frames transmitted by the rogue AP 415, and may inspect the control frames to identify whether the known BSS 410 (e.g., a BSS of a neighboring AP, relative to the neighboring AP 430) is in the SRG of the rogue AP 415. In this way, the sensor device 450 may detect the intrusion by the rogue AP 415. The sensor device 450 may signal the intrusion to the known AP 405, or may further characterize the intrusion and/or select a defensive posture for the known AP 405.

FIG. 5 is an exemplary method 500 of selecting a defensive posture for an AP, according to one or more embodiments. The method 500 may be used in conjunction with other embodiments, such as being performed using the intrusion characterization module 125 of FIG. 1. In some embodiments, the method 500 is performed as part of block 335 of FIG. 3.

The method 500 begins at block 505, where the intrusion characterization module 125 determines whether the intrusion by the rogue AP is a first intrusion that is, the rogue AP has not made any previous attempts to intrude in the known BSS. In some embodiments, determining whether the intrusion is a first intrusion corresponds to a predefined time period after detecting the intrusion.

When the intrusion is a first intrusion ("YES"), the known AP selects a first defensive posture 515. The method 500 proceeds from block 505 to block 525, where the intrusion characterization module 125 determines whether a BSS color is available for changing the color of the BSS of the known AP. In some embodiments, determining whether the BSS color is available comprises determining a BSS color that is (i) not included the SRG of the rogue AP and (ii) not being used by neighboring APs managed by the same managing entity as the known AP.

When a BSS color is available ("YES"), the method 500 proceeds to block 535 and the BSS color is changed. When no BSS color is available ("NO"), the method 500 proceeds to block 530 and the intrusion characterization module 125 changes a channel of the BSS. Generally, changing the BSS color may be preferable to changing the channel, as changing the BSS color tends to be less disruptive to the managed network.

In some alternate embodiments, the first defensive posture 515 is doing nothing (e.g., maintain the status quo ante) responsive to determining that the intrusion is a first intrusion. In some alternate embodiments, the method 500 proceeds to block 510 responsive to detecting the intrusion.

When the intrusion is not the first intrusion ("NO") within the predefined time window, the intrusion characterization module 125 may determine that the rogue AP will continue to actively target the known BSS, even though the BSS color or channel was already changed in the first defensive posture 515. When the intrusion is not a first intrusion ("NO"), the method 500 proceeds to the block 510, where the intrusion characterization module 125 characterizes the rogue AP (e.g., characterizing an intent of the intrusion). In some embodiments, the intrusion characterization module 125 characterizes the rogue AP into one of two characterizations (as shown, "benign" or "malicious"). However, different characterizations and/or different numbers of characterizations are also contemplated. FIG. 6, discussed below, provides an exemplary method of characterizing the rogue AP.

When the rogue AP is characterized as benign ("BENIGN"), the known AP selects the first defensive posture 515. When the rogue AP is characterized as malicious ("MALICIOUS"), the known AP selects a second defensive posture 520. The method 500 proceeds to block 540, where the intrusion characterization module 125 adds a BSS of the rogue AP to a SRG of the known AP. At block 545, the intrusion characterization module 125 adjusts a sensitivity threshold for the SRG. The intrusion characterization module 125 may change SRG OBSS/PD min and/or max values for the known BSS to cause the known AP's BSS to behave more aggressively toward the rogue AP's BSS. In some embodiments, increasing the SRG OBSS/PD max and/or min values makes the known AP's BSS more aggressive to the rogue AP's BSS. For example, the SRG OBSS/PD max and min values may be set to mirror the values that the rogue AP is using against the known AP, e.g., after accessing the values in the rogue AP's SRPS element, Such a configuration causes the known AP to be as aggressive to the rogue AP as the rogue AP is to the known AP.

In some embodiments, the intrusion characterization module 125 adjusts a sensitivity threshold for the SRG responsive to a calculated severity of the intrusion. In one example, the intrusion characterization module 125 performs the block 545 only when the severity of the intrusion exceeds a threshold value. When the severity of the intrusion is less than the threshold value, the intrusion characterization module 125 may take no action or perform another action. In another example, the intrusion characterization module 125 selects a value for the sensitivity threshold for the SRG based on the severity of the intrusion. The method 500 ends after completing one of the blocks 530, 535, and 545.

FIG. 6 is an exemplary method 600 of characterizing a rogue AP, according to one or more embodiments. The method 600 may be used in conjunction with other embodiments, such as being performed using the intrusion characterization module 125 of FIG. 1. In some embodiments, the method 600 is performed as part of block 330 of FIG. 3. The method 600 represents a heuristic-based approach in which several network metrics are assessed to generate a score representing a likelihood that an intrusion by a rogue BSS is intentional.

The method 600 begins at block 605, where the intrusion characterization module 125 calculates a frequency of addition of the known BSS to the SRG of the rogue AP/BSS during a predefined time period. At block 610, the intrusion characterization module 125 determines whether the frequency exceeds a threshold value. When the frequency does not exceed the threshold value ("NO"), the method 600 proceeds to block 635 and the rogue AP is characterized as "benign". When the frequency exceeds the threshold value ("YES"), the method 600 proceeds to block 615, where the intrusion characterization module 125 determines whether the media access control (MAC) address of the rogue AP is the same. In this way, the intrusion characterization module 125 may check whether a rogue AP with the same MAC address has been previously detected (e.g., an earlier attack on the known BSS), When the MAC address is the same ("YES"), the method 600 proceeds to block 630 and the rogue AP is characterized as "malicious".

When the MAC address is not the same ("NO"), the method 600 proceeds to block 620 and the intrusion characterization module 125 determines transmission characteristics of the rogue AP. In some embodiments, the intrusion characterization module 125 determines at least one of the following transmission characteristics of the rogue AP: a carrier frequency offset, a sampling frequency offset, a power amplifier characteristic, and an out-of-band power. At block 625, the intrusion characterization module 125 determines, based on the transmission characteristics, whether the radio signature of the rogue BSS is "close". In some embodiments, the radio signature of the rogue BSS is determined to be close when multiple transmission characteristics of the rogue BSS are highly correlated with those of a previous "attacker". For example, the correlation may exceed a threshold value.

If the radio signature is close ("YES"), the method 600 proceeds from the block 625 to the block 630 and the rogue AP is characterized as "malicious". If the radio signature is not close ("NO"), the method 600 proceeds from the block 625 to the block 635 and the rogue AP is characterized as benign. The method 600 ends after completing one of the blocks 630, 635.

Other techniques for characterizing the rogue AP are also contemplated. In some embodiments, a machine learning model may be used for characterizing the rogue AP. For example, a deep neural network (DNN) may include one or more inputs, one or more outputs, and multiple hidden layers between the one or more inputs and the one or more outputs. In some embodiments, the one or more inputs include one or more of the following: the BSS color of the rogue AP during multiple time instances, the BSS color of the known AP during the multiple time instances, a location of the rogue AP, received signal strength indicator (RSSI) values, and transmission characteristics of the rogue AP. The one or more outputs include a probability that the rogue AP is malicious (or intentional).

In some embodiments, the DNN is trained using a semi-supervised learning scheme. To determine the initial weights for the multiple hidden layers, one or more attackers may be simulated offline and the input parameters determined for the labeled data. In some embodiments, a number of hidden layers may be increased responsive to determining that a desired accuracy has not been achieved. In this way, the DNN may be less susceptible to overfitting to the labeled data.

While the network is in operation, intruding rogue APs may be predicted based on the input parameters. The weights may be adjusted concurrently based on the unlabeled data. In some embodiments, the unlabeled data may be labeled based on what the DNN predicts using its offline training. The newly-labeled data may be added with the earlier labeled data and the DNN retrained. In this way, the error will be minimized while the weights are adaptively adjusted.

As discussed above, the intrusion characterization module 125 may calculate a severity of the intrusion as part of characterizing the intrusion. The calculated severity may be used to determine the defensive posture of the known AP. In some embodiments, the calculated severity is a function of a plurality of characteristics of frames received from the rogue AP. The calculated severity may be a product of a linearization function performed on each of the plurality of characteristics. In one non-limiting example, the calculated severity may be calculated according to:

$$srg\_attack\_sev\_metric = \frac{lin(RR) * avg(lin(SRG-OBSS-PD-\min), lin(SRG-OBSS-PD-\max)) * lin(SRG-QBSS)}{lin(ATTACK\_HOPS)}$$

where RR represents a RSSI of the frames received from the rogue AP, the SRG-OBSS-PD-min and the SRG-QBSS-PD-max represent the SRG OBSS/PD min/max values of the control frames received from the rogue AP (where higher values generally indicate that that rogue AP is more aggressive), SRG-QBSS represents a channel load value (more specifically, a quality of service BSS (QBSS) load reported in beacon signals received from the rogue AP), and ATTACK HOPS represents a proximity of the known AP, neighboring AP, or sensor device that is detecting the intrusion. A linearization function is performed on each of RR, SRG-OBSS-PD-min, SRG-OBSS-PD-max, SRG-QBSS, and ATTACK HOPS.

In some embodiments, the QBSS load indicates in percentage the channel load. To represent an increased accuracy of the load that is caused specifically by the rogue AP, a sensor device or a monitoring/auxiliary radio on the known AP may directly measure the load it receives from the rogue AP, which may replace the SRG-QBSS value in the severity calculation or may be used in conjunction with the SRG-QBSS value.

In some embodiments, ATTACK HOPS is measured in terms of RF neighbor hops. For example, if the known BSS directly detects the attack with the known AP, ATTACK HOPS will be set to a "1" value. If the detection is detected by a neighboring AP or a sensor device, ATTACK HOPS will be set to the number of RF hops from the known BSS plus 1.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for use with an access point (AP), the method comprising:
    inspecting control frames received from a first rogue AP in a first spatial reuse group (SRG), wherein the AP is in a second SRG different from the first SRG;
    detecting an intrusion by the first rogue AP in response to determining that the control frames from the first rogue AP include a basic service set (BSS) color of the second SRG;
    characterizing the intrusion by the first rogue AP as malicious or benign based on a frequency at which the control frames from the first rogue AP include the BSS color of the second SRG over a predefined period of time and based on a determination of a previous intrusion by the first rogue AP on the second SRG; and
    selecting a defensive posture for the AP based on characterizing the intrusion as malicious; and
    chancing the BSS color of the second SRG based on characterizing the intrusion as benign.

2. The method of claim 1, wherein the AP inspects the control frames and determines that the control frames include the BSS color of the second SRG.

3. The method of claim 1, wherein a neighboring AP inspects the control frames and determines that the control frames include the BSS color of the second SRG.

4. The method of claim 1, wherein a sensor device inspects the control frames and determines that the control frames include the BSS color of the second SRG.

5. The method of claim 1, wherein characterizing the intrusion as malicious or benign is further based on at least one of the following:
    a carrier frequency offset of the rogue AP;
    a sampling frequency offset of the rogue AP;
    a power amplifier characteristic of the rogue AP; and
    an out-of-band power of the rogue AP.

6. The method of claim 1, wherein selecting the defensive posture for the AP comprises:
    adding a BSS of the rogue AP to the second SRG; and
    adjusting an overlapping basic service set packet detect (OBSS/PD) threshold for the first SRG to be equal to an OBSS/PD threshold for the second SRG.

7. The method of claim 1, wherein characterizing the intrusion as malicious or benign is further based on at least one of the following:
    a received signal strength indicator (RSSI) value of received frames from a basic service set (BSS) of the rogue AP;
    a spatial reuse group overlapping basic service set packet detect minimum (SRG OBSS PD min) threshold value in the control frames;
    a SRG OBSS PD maximum (max) threshold value in the control frames;
    a channel load value corresponding to the BSS of the rogue AP; and
    an attack hops value representing a proximity of the AP to the rogue AP.

8. An access point (AP) comprising:
    one or more computer processors configured to:
        detect an intrusion by a first rogue AP in a first SRG in response to determining that control frames from the first rogue AP include a BSS color of a second SRG of the AP different from the first SRG;
        characterize the intrusion as malicious or benign based on a frequency at which the control frames from the first rogue AP include the BSS color of the second SRG over a predefined period of time and based on a determination of a previous intrusion by the first rogue AP on the second SRG;
        select a defensive posture for the AP based on characterizing the intrusion as malicious; and
        change the BSS color of the second SRG based on characterizing the intrusion as benign.

9. The AP of claim 8, wherein the one or more computer processors are further configured to inspect the control frames and to determine that the control frames include the BSS color of the second SRG.

10. The AP of claim 8, wherein at least one of a neighboring AP or a sensor device inspects the control frames and determines that the control frames include the BSS color of the second SRG.

11. The AP of claim 8, wherein characterizing the intrusion as malicious is further based on at least one of the following:
    a carrier frequency offset of the rogue AP;
    a sampling frequency offset of the rogue AP;
    a power amplifier characteristic of the rogue AP; and
    an out-of-band power of the rogue AP.

12. The AP of claim 8, wherein selecting the defensive posture for the AP comprises:
    adding a BSS of the rogue AP to the second SRG; and
    adjusting an OBSS/PD threshold for the first SRG to be equal to an OBSS/PD threshold for the second SRG.

13. The AP of claim 8, wherein characterizing the intrusion as malicious or benign is further based on at least one of the following
    a received signal strength indicator (RSSI) value of received frames from a basic service set (BSS) of the rogue AP;
    a spatial reuse group overlapping basic service set packet detect minimum (SRG OBSS PD min) threshold value in the control frames;
    a SRG OBSS PD maximum (max) threshold value in the control frames;

a channel load value corresponding to the BSS of the rogue AP; and an attack hops value representing a proximity of the AP to the rogue AP.

14. A computer program product comprising:

a non-transitory computer-readable storage medium having computer-readable program code embodied therewith, the computer-readable program code executable by one or more computer processors to perform an operation comprising:

detecting an intrusion by a rogue AP in a first SRG in response to determining that control frames from the rogue AP include a BSS color of a second SRG of a known AP different from the first SRG; and characterizing the intrusion as malicious or benign based on a frequency at which the control frames from the rogue AP include the BSS color of the second SRG over a predefined period of time and based on a determination of a previous intrusion by the first rogue AP on the second SRG, wherein characterizing the intrusion as malicious is used to select a defensive posture for the known AP, and wherein the BSS color of the second SRG is changed based on characterizing the intrusion as benign.

15. The computer program product of claim 14, wherein selecting the defensive posture for the known AP comprises:

adding a BSS of the rogue AP to the first SRG and adjusting an OBSS/PD threshold for the first SRG to be equal to an OBSS/PD threshold for the second SRG.

16. The computer program product of claim 14, wherein characterizing the intrusion as malicious or benign is further based on at least one of the following:

a received signal strength indicator (RSSI) value of received frames from a basic service set (BSS) of the rogue AP;

a spatial reuse group overlapping basic service set packet detect minimum (SRG OBSS PD min) threshold value in the control frames;

a SRG OBSS PD maximum (max) threshold value in the control frames;

a channel load value corresponding to the BSS of the rogue AP; and an attack hops value representing a proximity of the known AP to the rogue AP.

* * * * *

UNITED STATES PATENT AND TRADEMARK OFFICE
CERTIFICATE OF CORRECTION

| | |
|---|---|
| PATENT NO. | : 11,540,135 B2 |
| APPLICATION NO. | : 16/869370 |
| DATED | : December 27, 2022 |
| INVENTOR(S) | : Gautam D. Bhanage et al. |

It is certified that error appears in the above-identified patent and that said Letters Patent is hereby corrected as shown below:

In the Specification

In Column 6, Line 13 (approx.), delete "415," and insert -- 415. --.

In Column 6, Line 44, delete "415," and insert -- 415. --.

In Column 8, Line 15, delete "element," and insert -- element. --.

In Column 8, Line 56, delete "BSS)," and insert -- BSS). --.

In Column 9, Line 67, delete "QBSS" and insert -- OBSS --.

In the Claims

In Column 11, Line 48, in Claim 1, delete "chancing" and insert -- changing --.

In Column 12, Line 59, in Claim 13, delete "following" and insert -- following: --.

Signed and Sealed this
Twenty-fifth Day of April, 2023

Katherine Kelly Vidal
*Director of the United States Patent and Trademark Office*